United States Patent Office 3,402,223
Patented Sept. 17, 1968

3,402,223
HIGH MOLECULAR WEIGHT ETHYLENE CO-
POLYMER AND LOW MOLECULAR WEIGHT
ETHYLENE-VINYL ACETATE COPOLYMER
BLEND
John Burton Lee Hollingsworth, Bound Brook, N.J., assignor to Union Carbide Corporation, a corporation of New York
No Drawing. Filed Mar. 23, 1966, Ser. No. 536,631
7 Claims. (Cl. 260—897)

ABSTRACT OF THE DISCLOSURE

An improvement in both stress crack resistance and low temperature brittleness is obtained when a high melt index ethylene-vinyl acetate copolymer is added to a base resin which is a copolymer of ethylene with a minor amount of ethyl acrylate or vinyl acetate.

---

This invention relates to a novel blend of copolymers which provides both excellent stress crack resistance and excellent low temperature nonbrittleness. More particularly this invention relates to polymer composition blends of relatively high molecular weight ethylene-ethyl acrylate copolymer or ethylene-vinyl acetate copolymer and relatively low molecular weight ethylene-vinyl acetate copolymer. These compositions find particular utility as cable coating compositions.

The use of polyethylene and its copolymers in various applications has been long known in the art. Two problems which have been long recognized as being attendant in the use of this material are low stress crack resistance and relatively high low temperature embrittlement values.

Stress cracking is the propensity of a polymer to crack when placed under stress in contact with a variety of agents, such as detergents which promote polymer cracking.

Low temperature embrittlement as used herein is the temperature at which 50 percent of the samples fail under a constant impact. Generally, however, this property is an indication of the characteristic of certain polymers to become brittle at low temperatures and crack when subjected to mechanical stress.

Various additives have been proposed to overcome these deficiencies but these additives have invariably only provided a desired increase in one property to the detriment of the other. For example, it has been proposed to add low molecular weight ethylene-vinyl acetate copolymer to high molecular weight polyethylene to provide a composition for use as a cable coating which has improved stress crack resistance and such compositions do indeed provide enhanced stress crack resistance. The low temperature brittleness properties of these compositions is, however, less than that of the unmodified polyethylene. Similar results are obtained with most other additives. One property is served to the detriment of the other.

It has now been found that a cable coating composition utilizing high molecular weight ethylene-ethyl acrylate copolymer or ethylene-vinyl acetate copolymer as the base polymer provides improved stress crack resistance without substantially deteriorating the low temperature brittleness of the polymer composition.

In accordance with this invention it has been found that exceptionally stress crack resistance and exceptional low temperature brittleness is provided by a composition comprising either ethylene-ethyl acrylate copolymer containing from 1.3 to 2.3 weight percent polymerized ethyl acrylate and having a melt index of from 0.10 to 0.25 decigrams per minute; or an ethylene-vinyl acetate copolymer containing from about 0.5 to 1.3 weight percent polymerized vinyl acetate and having a melt index of from 0.1 to 0.25; and from about 0.8 to about 3.0 weight percent based on the weight of the high molecular weight base copolymer of an ethylene-vinyl acetate copolymer containing from about 24 to about 30 weight percent combined vinyl acetate and exhibiting a melt index from about 150 to about 450 decigrams per minute.

While as indicated above, the high molecular weight ethylene-ethyl acrylate copolymer and the ethylene-vinyl acetate copolymer should contain from 1.3 to 2.3 weight percent ethyl acrylate and 0.5 to 1.3 weight percent vinyl acetate, respectively, it is preferred that these polymers contain combined monomer in the amounts of 1.7 to 1.9 weight percent combined ethyl acrylate and 0.8 to 1.0 weight percent combined vinyl acetate, respectively.

Similarly the low molecular weight ethylene-vinyl acetate copolymer preferably contains from about 26 to 28 weight percent combined vinyl acetate and preferably exhibits a melt index of from 250 to 350 decigrams per minute. The preferred amount of low molecular weight ethylene-vinyl acetate copolymer is from 1.5 to about 2.5 weight percent based on the weight of the high molecular weight base polymer. These preferences set forth above are dictated by the optimum properties which these ranges provide.

The compositions of this invention can contain such additives and ingredients as are normally used in the art to provide certain desired characteristics to the composition. Such additives include, but are not limited to stabilizers, fillers, pigments, antioxidants and the like. A particularly desirable additive is carbon black which serves both as filler pigment and ultraviolet stabilizer. As indicated above, the compositions of this invention find particular utility as cable coating materials and in such applications they can be utilized by any conventional coating procedure, such as by melt extrusion. The example which follows serves to illustrate the composition of this invention:

In the example which follows the following test procedures were used.

Brittleness temperature: ASTM D–746.

Stress-crack resistance: Twenty samples 0.5 inch wide were cut in the transverse direction along approximately ⅓ the circumference of a pipe (1.5 inches). These samples were then prepared according to the ASTM tentative test method D–1693–60T and tested for crack resistance at 50° C. in a water solution of 10% Igepal CO–630 omitting boiling water conditioning.

Example

A simulated cable jacket was extruded from each of five resin compositions A–E in the form of a 1½ inch (inside diameter pipe) having a 90 mil wall. These pipes were extruded from a standard plastics melt extruder under the following conditions:

| | | |
|---|---|---|
| Melt temperature | ° F | 370 |
| Line speed | ft./min | 8 |
| Head pressure | p.s.i. | 750 |
| Screw speed | r.p.m. | 40 |
| Draw down ratio | | 3/1 |
| Bath temperature | ° F | 60 |

The resin compositions used had the following formulation:

| Resin composition | Resin | Additive (percent carbon black) |
|---|---|---|
| A | High molecular weight polyethylene-melt index 0.23, density 0.92. | 2.6 |
| B | High molecular weight ethylene vinyl acetate copolymer having a melt index of 0.23 containing 1.8 percent polymerized vinyl acetate. | 2.6 |
| C | High molecular weight polyethylene containing 5 percent low molecular weight ethylene vinyl acetate copolymer and the blend having a melt index of 0.23 and a total vinyl acetate content of 1.4 percent. | 2.6 |
| D | High molecular weight ethylene-ethyl acrylate copolymer containing 1.8 percent ethyl acrylate and 2 percent low molecular weight ethylene vinyl acetate having a melt index of 400 and 28 percent vinyl acetate and having 0.6 percent vinyl acetate in the blended product. The blend having a melt index of 0.23. | 2.6 |
| E | High molecular weight ethylene-vinyl acetate copolymer containing 1.0 percent combined vinyl acetate and having a melt index of 0.23 and 2 percent low molecular weight ethylene-vinyl acetate copolymer containing 28 weight percent combined vinyl acetate having a melt index of 400. The blend had a melt index of about .23 and a total vinyl acetate content of about 1.5 percent. | 2.6 |

Each of the five pipe samples were evaluated for stress crack resistance and brittleness temperature. Each sample was conditioned at 70° F. for 20 hours prior to testing.

The results of these evaluations are set forth in the table below:

TABLE

| Resin composition | Stress-crack resistance, failures in 48 hrs. (percent) | Brittleness temperature (° C.) |
|---|---|---|
| A | 100 | −90 |
| B | 80 | −95 |
| C | 0 | −85 |
| D | 10 | −100 |
| E | 10 | −100 |

From this data it becomes apparent that composition C provides the best stress crack resistance but at the sacrifice of nonbrittleness. Composition D provides both excellent stress crack resistance and nonbrittleness.

Equivalent determinations on high molecular weight ethylene-ethyl acrylate copolymer demonstrated a stress crack of about 80% failure and a brittle temperature of about −105° C., and for the low molecular weight ethylene-vinyl acetate copolymer 0 percent stress crack failure and about −40° C. for brittleness.

What is claimed is:

1. A polymer composition exhibiting improved stress-crack resistance and improved low temperature brittleness comprising a base polymer selected from the group consisting of:

(A) ethylene-ethyl acrylate copolymer containing from 1.3 to 2.3 weight percent polymerized ethyl acrylate and having a melt index from .1 to .25 decigram per minute, and (B) ethylene-vinyl acetate copolymer containing from 0.5 to 1.3 weight percent polymerized vinyl acetate and having a melt index of from .1 to .25, and from about 0.8 to about 3.0 weight percent based on the weight of the base polymer of a low molecular weight ethylenevinyl acetate copolymer containing from about 24 to about 30 weight percent polymerized vinyl acetate and having a melt index of from about 150 to about 450 decigrams per minute.

2. The polymer composition of claim 1 wherein the base polymer is ethylene-ethyl acrylate copolymer.

3. The polymer composition of claim 1 wherein the base polymer is ethylene-vinyl acetate copolymer.

4. The polymer composition of claim 2 wherein the ethylene-ethyl acrylate copolymer contains 1.7 to 1.9 weight percent polymerized ethyl acrylate.

5. The polymer composition of claim 3 wherein the ethylene-vinyl acetate copolymer base contains 0.8 to 1.0 weight percent combined vinyl acetate.

6. The polymer composition of claim 1 wherein the low molecular weight ethylene-vinyl acetate copolymer is present in an amount of from 1.5 to 2.5 percent.

7. The polymer composition of claim 6 wherein the low molecular weight ethylene-vinyl acetate copolymer contains from 26 to 28 weight percent combined vinyl acetate and exhibits a melt index of from 250 to 350 decigrams per minute.

References Cited

UNITED STATES PATENTS

| 3,156,666 | 11/1964 | Pruett. | |
| 3,182,101 | 5/1965 | Rees. | |
| 3,203,921 | 8/1965 | Rosenfelder. | |
| 2,953,541 | 9/1960 | Pecha et al. | 260—897 |
| 3,183,283 | 5/1965 | Reding | 260—897 |
| 3,219,728 | 11/1965 | Joris et al. | 260—897 |
| 3,231,636 | 1/1966 | Snyder et al. | 260—897 |
| 3,248,359 | 4/1966 | Maloney | 260—897 |

FOREIGN PATENTS 582,093  11/1946  Great Britain.

GEORGE F. LESMES, *Primary Examiner.*

MURRAY TILLMAN, *Examiner.*

T. G. FIELD, *Assistant Examiner.*

Notice of Adverse Decisions in Interferences

In Interference No. 97,285 involving Patent No. 3,402,223, J. B. L. Hollingsworth, HIGH MOLECULAR WEIGHT ETHYLENE COPOLYMER AND LOW MOLECULAR WEIGHT ETHYLENE-VINYL ACETATE COPOLYMER BLEND, final judgment adverse to the patentee was rendered Nov. 1, 1972, as to claims 3, 6 and 7.

[*Official Gazette May 8, 1973.*]